US008411182B2

(12) United States Patent
Tewinkle

(10) Patent No.: US 8,411,182 B2
(45) Date of Patent: Apr. 2, 2013

(54) SYSTEM FOR CONTROLLING INTEGRATION TIMES OF PHOTOSENSORS IN AN IMAGING DEVICE

(75) Inventor: Scott L. Tewinkle, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 2435 days.

(21) Appl. No.: 11/143,173

(22) Filed: Jun. 2, 2005

(65) Prior Publication Data

US 2006/0274174 A1    Dec. 7, 2006

(51) Int. Cl.
*H04N 3/14* (2006.01)
(52) U.S. Cl. ..................................... 348/297
(58) Field of Classification Search .......... 348/272–275, 348/294; 358/512–515
See application file for complete search history.

(56) References Cited

U.S. PATENT DOCUMENTS

| 5,148,168 | A | 9/1992 | Masuda et al. |
| 5,519,514 | A | 5/1996 | TeWinkle |
| 7,009,740 | B2 * | 3/2006 | Sakai .......................... 358/514 |

FOREIGN PATENT DOCUMENTS

JP    11-122422    4/1999

OTHER PUBLICATIONS

Scott L. Tewinkle et al., entitled "System for Controlling Image Data Readout from an Imaging Device," U.S. Appl. No. 11/143,245, being filed simultaneously herewith.

* cited by examiner

*Primary Examiner* — Chieh M Fan
*Assistant Examiner* — Akshay Trehan
(74) *Attorney, Agent, or Firm* — Simpson & Simpson, PLLC

(57) ABSTRACT

A photosensor chip, such as used in a hard-copy scanner, reads out image data in repeated cycles. With each cycle an on-board counter counts to a predetermined number and resets to zero. When the clock count reaches certain numbers, integration events are initiated with regard to different subsets of photosensors on the chip. The start and stop times of the integrations within each cycle can thus be adjusted via software instructions.

17 Claims, 2 Drawing Sheets

SYSTEM FOR CONTROLLING INTEGRATION TIMES OF PHOTOSENSORS IN AN IMAGING DEVICE

CROSS-REFERENCE TO RELATED APPLICATION

Cross-reference is hereby made to the following U.S. patent application, assigned to the Assignee hereof, being filed simultaneously herewith: "System for Controlling Image Data Readout from an Imaging Device," U.S. application Ser. No. 11/143 245, now U.S. Publication No. 20060274175.

INCORPORATION BY REFERENCE

The following US patents are hereby incorporated by reference in their entireties: U.S. Pat. Nos. 5,148,168 and 5,519,514.

TECHNICAL FIELD

The present disclosure relates to image scanning arrays in which a set of photosensors are arranged in a linear array, such as for scanning of hard copy images for conversion to digital data.

BACKGROUND

Image sensor arrays typically comprise a linear array of photosensors which raster scan an image-bearing document and convert the microscopic image areas viewed by each photosensor to video image signals. Following an integration period, the image signal charges formed on the photosensors are amplified and transferred as analog video signals to a common output line or bus through successively actuated multiplexing transistors.

For high-performance image sensor arrays, one design includes an array of photosensors of a width comparable to the width of a page being scanned, to permit imaging generally without the use of reductive optics. In order to provide such a "full-width" array, however, relatively large silicon structures must be used to define the large number of photosensors. In one design, an array is made of twenty silicon chips, butted end-to-end, each chip having 248 active photosensors spaced at 400 photosensors per inch. Typically, the chips which are butted to form the array are formed in a silicon wafer, which is then "diced" into a number of chips, which are individually tested and then arranged into a bar shape.

In a sensor array of this design, each of the chips is a separate integrated circuit. Typically, each chip has its own individual video output, for the downloading of image signals ultimately from the photosensors on that particular chip. When an image is being scanned, video signals are output from each chip at a very high rate as the original hard-copy image moves past the linear array of photosensors on the chip. Thus, if the intended resolution of the chip in a bar is 400 spots per inch, a line of video data must be output from the chip every time the original image moves 1/400th of an inch.

An important concept with digital image scanners is "integration time." The integration time is analogous to the opening and closing of the shutter of a film camera: it is the time period in which light from an image to be recorded is received. In the context of recording digital images, an integration time begins when a photosensor is set at a predetermined reference charge level and light impinging on the photosensor is permitted to influence the charge; the integration time ends when received light no longer influences the photosensor and the final charge is loaded out of the photosensor as a video signal. U.S. Pat. No. 5,148,168 gives a description of one embodiment of an image sensor in which three sets of photosensors, one for each primary color, are used to record a full-color image. U.S. Pat. No. 5,519,514 explains why precise control of the integration times of each of the three primary-color sets of photosensors is important to resulting image quality in a hard-copy scanner.

SUMMARY

According to one aspect, there is provided an imaging apparatus, comprising a first subset of photosensors, a counter for repeatedly outputting a clock count to a predetermined maximum number, and a controller. The controller causes the first subset of photosensors to change an integration state in response to the clock count reaching a predetermined first number.

According to another aspect, there is provided a method of operating an imaging apparatus, the apparatus having a first subset of photosensors, comprising outputting a clock count to a predetermined maximum number. As a result of the clock count reaching a first number, an integration state of the first subset of photosensors is changed.

According to another aspect, there is provided an imaging apparatus, comprising a first chip, having a first subset of photosensors, and a second chip, having a second set of photosensors. At least one counter repeatedly outputs a clock count to a predetermined maximum number. The first chip outputs a set of image signals from the first subset of photosensors in response to the clock count reaching a predetermined first number and the second chip outputs a set of image signals from the second subset of photosensors in response to the clock count reaching a predetermined second number.

DETAILED DESCRIPTION

Figure 1:
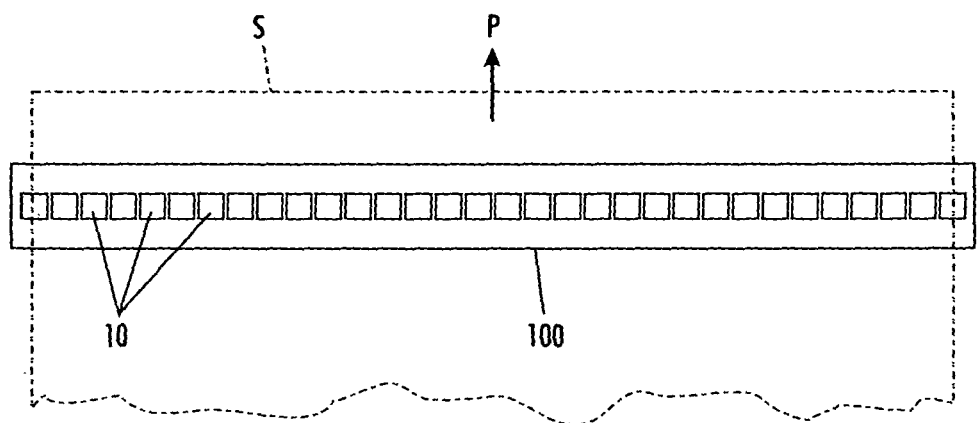
FIG. 1 is a plan view of a portion of a "full-width-array" input scanner as would be used in office equipment such as a digital copier.

FIG. 1 is a plan view of a portion of a "full-width-array" input scanner as would be used in office equipment such as a digital copier. A set of photosensor chips, each indicated as 10, is arranged on a circuit board 100. Each chip 10 includes a set of photosensors, as will be described below. Together, the chips 10 on board 100 form one or more linear arrays of photosensors that extend a length comparable to the width of an image-bearing sheet such as S effectively moving in a process direction P. The sheet S can move relative to the board 100 by being placed on a platen (not shown) relative to which the board 100 moves; or the sheet S can be fed through a document handler (not shown). As the sheet S moves past board 100, a series of small areas on the sheet S reflect light (from a source, not shown) into photosensors on the chips 10. The chips 10 receive the reflected light from sheet S and output image signals for subsequent recording and processing.

Figure 2:
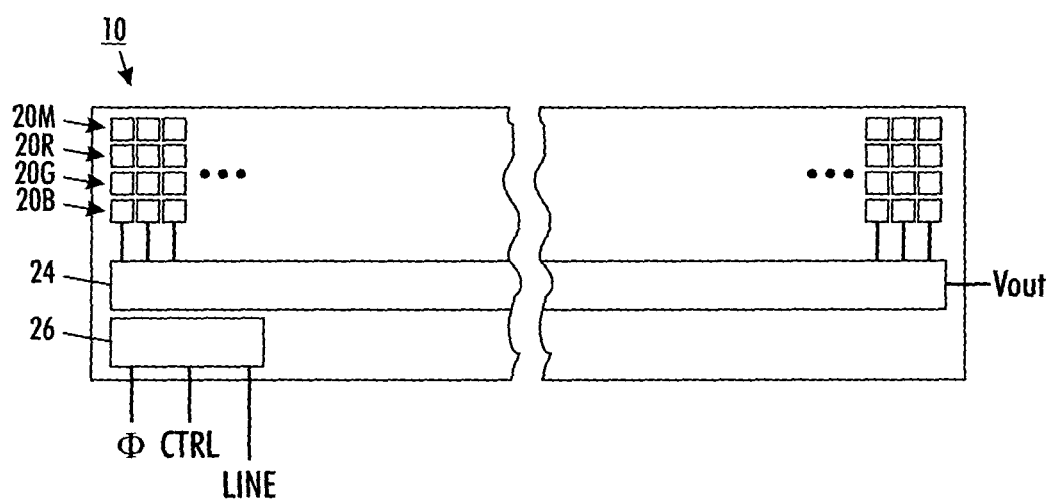
FIG. 2 is a plan view of a photosensor chip in isolation.

FIG. 2 shows a photosensor chip 10 in isolation. In this embodiment, each chip 10 includes four linear arrays, or rows, of photosensors, labeled 20M (for monochrome), 20R (for red), 20G (for green) and 20B (for blue). Each array is provided with a translucent filter (not shown) that causes the array to be sensitive to a particular color or range of wavelength. The monochrome array 20M is sensitive to light throughout the visible spectrum, and is useful when scanning images for monochrome-only image data, as would be useful, for example, in a monochrome copier or facsimile machine, or for optical character scanning. The photosensors may also be provided with other types of filters, such as for infrared blocking.

In the present embodiment, for each "column" (as shown in the Figure) of one photosensor of each type 20M, 20R, 20G, 20B, there is one output line to an output shift register 24. A general description of how multiple photosensors in a column send signals over one line to a shift register is given in U.S. Pat. No. 5,148,168 mentioned above. It will be evident that each photosensor of each type 20M. 20R, 20G, 20B in a column will "look at" one small area of an image being recorded, to obtain full color image data about the small area. A description of how the action of multiple photosensors of different colors must be coordinated is given in U.S. Pat. No. 5,519,514 mentioned above. Once a "scanline" of digital image signals is loaded into shift register 24, the image data for that scanline is output from the chip 10, such as through line $V_{OUT}$.

Figure 3:
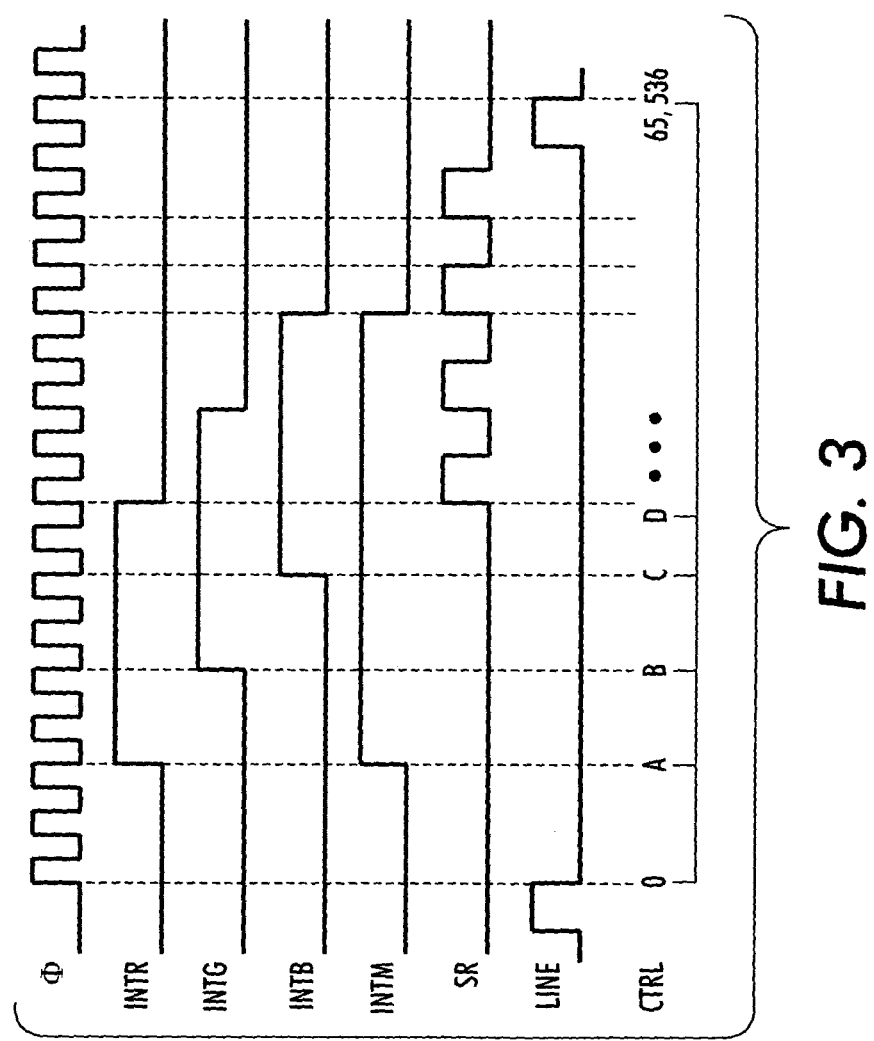
FIG. 3 is a simplified timing diagram showing a typical operation of a chip for one cycle of operation.

As mentioned above, a key control for a chip 10 is the start and stop times defining an "integration time" of each photosensor. FIG. 3 is a simplified timing diagram showing a typical operation of a chip 10 for one cycle of operation, i.e., the reading out of all color image data for one scan line of an image being recorded. For each line (or signal) in time INTR, INTG, INTB, INTM, in this embodiment, the line goes "high" at a time corresponding to the start of the integration time for the corresponding color photosensor (or photosensor row) in the cycle. (The fact the line goes "high" during the integration time is a mere convention of the Figure; in any practical embodiment, the line may in fact go "low," or do something else, during the integration time.) In this case, the integration times for the primary-color-filtered photosensors are staggered in time, to reflect the fact the they must look at the same small area of the moving image on sheet S; the monochrome integration time can be adjusted as desired for a particular application. There may also be a signal SR that controls the shift register in some way to read out the video signals for a scanline: in the example of FIG. 3, a pulse is provided to the shift register after the end of every integration time for each subset of photosensors, and also to allow readout of all signals from the shift register onto $V_{out}$. For purposes of discussion, these signals are processed within an on-board controller 26 on chip 10, the exact nature of which will depend on a specific implementation.

Also shown in FIG. 3 is a pixel clock signal φ. In this embodiment, any change of state (low to high or high to low) of any line occurs at a "down" action of the pixel clock. The pixel clock can originate on board a chip 10, or be provided external to the chip, as shown in FIG. 2. In one embodiment, there is provided, within a control system such as 26 on a chip 10, a counter, which counts the cycles of the pixel clock φ up to a predetermined number (a "clock count") corresponding generally to the duration of an operational cycle of the chip (such as, the time to record and output one scanline of image data), and then resets to zero. In one practical embodiment, the counter counts from 0 to 65,536 with each operational cycle. As further can be seen, in the present embodiment, another line to the chip 10 carries a LINE pulse that, when activated, cause the counter to reset to zero. Referring to FIG. 2, the LINE pulse can be provided to the chip by an external control.

As the counter counts through each cycle, different events relating to the operation of the chip, including those relating to the start and stop of integration times for each row or photosensors (broadly, "changes in integration state" of any kind, such term including steps such as placing a predetermined reference voltage on the photosensor), can be "tied" to specific clock counts reached by the counter in each cycle. To take the FIG. 3 example, if the counter CNTR, starting at zero, reaches a clock count equaling A, the INTR signal goes high and causes the integration time of photosensor (or photosensor row) 20R to begin; at count B, INTG goes high, at count C, INTB goes high, etc. As can be further seen, when CNTR reaches a dock count equaling D, the INTR signal goes low and thus causes the integration time of photosensor (or photosensor row) 20R to end; other changes in integration state are caused to occur as CNTR reaches certain counts as shown by the various vertical dotted lines in FIG. 3. In this embodiment, the control system is sensitive to the clock count reaching predetermined numbers, and controls the circuitry in chip 10 to carry out certain actions when certain predetermined numbers are reached.

The advantage of tying actions of the chip to the clock count maintained by the counter is that fine controls of the operation of the chip can be carried out by loading numbers, such as corresponding to the predetermined number A, B, C, D, etc., into the chip 10, through a programming path such as including the line CTRL in FIG. 2. By tweaking those clock count values that cause integration events of various photosensors or photosensor rows, the starts and stops of integration times are precisely controlled and adjusted. In choosing values for A, B, C, D, etc., an operator can finely control the integration time (both in terms of start time and duration) for each of the rows of photosensors. Because, in a practical embodiment, the clock count goes from zero to 65,536 with every cycle, the timings can be very precisely controlled, even if the same basic design of chip is employed in different overall designs of a scanner, such as operating at different sheet speeds.

When the chip 10 is in what can be called a "control loading mode," numbers corresponding to the predetermined numbers are loaded through the programming path into registers on the chip. Using this system, changes in integration times can be readily made to a machine, such as a copier, already installed at a customer site, such as in response to scanning of a test sheet and examination of the output image data, and can even be made remotely, by sending electronic instructions to a machine.

Another practical option of the present disclosure is that, by appropriately selecting count values for specific rows of photosensors, certain rows of photosensors can be effectively inactivated. For instance, if it is desired to operate the apparatus in a purely monochrome mode, clock count values for controlling the integration times of the primary-color-filtered photosensors can be set so that no integration actions occur to them, leaving only the operation of the monochrome photosensors 20M; this can be done by setting the clock count values at all zeroes, for example, or at a number higher than the count at which the count is reset, so that the count level is never reached. Because this control is carried out by loading numbers into the chip 10 via software, this change in the basic operation of the apparatus can be accomplished by sending suitable instructions through the CTRL line of one or more chips in an apparatus.

In a scanner, such as shown in FIG. 1, or other device having multiple chips 10, there may further be a necessity to coordinate the readouts of each chip so the chips collectively can output data related to a single image. With a system as here described, the exact time at which signals are read out of a particular chip (relative to other chips) during an operational cycle can be precisely controlled, by loading in for each chip a precisely-defined clock count value corresponding to when the chip is to output image data-for a scan line. In the FIG. 3 embodiment, this readout time corresponds to the fourth pulse on line SR: the location in time of this pulse corresponds to when the particular chip 10 reads out its data. One chip 10 in scanner 100 (such as in FIG. 1) will have a clock count value at one point in the operational cycle, while a second chip in scanner 100 will have a clock count value at a later point in the operational cycle, so that the output of the second chip will follow the output of the first chip when the chips are working together; indeed, the clock count value for each of a large set of chips 10, such as in scanner 100 in FIG. 1, are coordinated to the entire scanner 100 can read out image data through one or a small number of channels. In this way, the co-linear photosensor arrays on different chips 10 in a scanner 100 can effectively operate as a single linear array. The clock count values for controlling the shift register of each chip 10 for readout of image signals can be entered into each chip through the same channels and registers as for the integration times as described above.

Although the present embodiment is directed toward controlling the integration times of different-filtered linear rows of photosensors, the operating principle can be applied to controlling any kind of subsets of photosensors in an apparatus, such as in a two-dimensional photosensor array as would be found in a digital camera. The different, effectively independently-controllable subsets could be related by color (such as to alter the color balance or other output of the apparatus); or by sub-area within a the linear or two-dimensional array (in case only a portion of the array is desired to be used). Photosensors of different subsets could be commingled with each other within the array, such as to enable "low resolution" operation, i.e., in low resolution only an evenly-distributed subset of photosensors are read out. The overall system can also facilitate an array wherein one subset of photosensors are effectively provided with a longer integration or exposure time than another subset: such an arrangement may be useful in improving the exposure latitude of a digital camera, such as to allow effectively taking a long-exposure picture and a short-exposure picture simultaneously.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. An imaging apparatus, comprising:
   a first subset of photosensors;
   a counter for repeatedly outputting a clock count to a predetermined maximum number; and
   a controller, the controller causing the first subset of photosensors to change an integration state in response to the clock count reaching a predetermined first number.

2. The apparatus of claim 1, the change in integration state being at least one of a start of an integration time and an end of an integration time.

3. The apparatus of claim 1, further comprising
   at least one register for retaining a value for the predetermined first number.

4. The apparatus of claim 1, further comprising
   at least a portion of a programming path for loading values for the predetermined first number.

5. The apparatus of claim 1, further comprising
   a second subset of photosensors; and
   the controller causing the second subset of photosensors to change an integration state in response to the clock count reaching a predetermined second number.

6. The apparatus of claim 5, the first subset of photosensors being associated with a first linear array and the second subset of photosensors being associated with a second linear array.

7. The apparatus of claim 5, the controller being programmable to effectively inactivate the second subset of photosensors.

8. The apparatus of claim 5, the first subset of photosensors being sensitive to a first range of wavelength, and the second subset of photosensors being sensitive to a second range of wavelength.

9. The apparatus of claim 5, the first subset of photosensors, second subset of photosensors, and controller being defined in a single chip.

10. An imaging apparatus, comprising:
    a first subset of photosensors, the first subset of photosensors being sensitive to a first range of wavelength and forming a first linear array;
    a second subset of photosensors, the second subset of photosensors being sensitive to a second range of wavelength and forming a second linear array;
    a counter for repeatedly outputting a clock count to a predetermined maximum number; and
    a controller, the controller causing the first subset of photosensors to change an integration state in response to the clock count reaching a predetermined first number and causing the second subset of photosensors to change an integration state in response to the clock count reaching a predetermined second number;
    the first subset of photosensors, second subset of photosensors, and controller being defined in a single chip;
    at least a portion of a programming path for loading values for the predetermined first number and the predetermined second number; and
    at least one register for retaining values for the predetermined first number and the predetermined second number.

11. An imaging apparatus, comprising:
    a first chip, having a first subset of photosensors;
    a second chip, having a second set of photosensors;
    at least one counter for repeatedly outputting a clock count to a predetermined maximum number; and
    the first chip outputting a set of image signals from the first subset of photosensors in response to the clock count reaching a predetermined first number and the second chip outputting a set of image signals from the second subset of photosensors in response to the clock count reaching a predetermined second number.

12. The apparatus of claim 11, wherein the predetermined second number is of a relationship to the first predetermined number such that an output of image signals from the second chip follows an output of image signals from the first chip.

13. The apparatus of claim 11, the first chip having a counter thereon.

14. The apparatus of claim 11, the first chip having a first counter thereon and the second chip having a second counter thereon.

15. The apparatus of claim 11, the first chip having at least one register for retaining a value for the predetermined first number.

16. The apparatus of claim 11, the first chip having at least a portion of a programming path for loading values for the predetermined first number.

17. The apparatus of claim 11, wherein the first subset of photosensors and the second set of photosensors are substantially co-linear.

* * * * *